United States Patent
Li et al.

(10) Patent No.: US 11,121,811 B2
(45) Date of Patent: Sep. 14, 2021

(54) DATA ENCAPSULATION AND TRANSMISSION METHODS, DEVICE, AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Han Li, Beijing (CN); Weiqiang Cheng, Beijing (CN); Lei Wang, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 0 days.

(21) Appl. No.: 16/474,167

(22) PCT Filed: Dec. 26, 2017

(86) PCT No.: PCT/CN2017/118630
§ 371 (c)(1),
(2) Date: Jun. 27, 2019

(87) PCT Pub. No.: WO2018/121529
PCT Pub. Date: Jul. 5, 2018

(65) Prior Publication Data
US 2019/0349133 A1 Nov. 14, 2019

(30) Foreign Application Priority Data
Dec. 27, 2016 (CN) .......................... 201611229086.0

(51) Int. Cl.
*H04L 1/00* (2006.01)
*H04J 3/16* (2006.01)
*H04Q 11/00* (2006.01)

(52) U.S. Cl.
CPC .......... *H04L 1/0071* (2013.01); *H04J 3/1652* (2013.01); *H04L 1/0063* (2013.01);
(Continued)

(58) Field of Classification Search
CPC .... H04L 1/0071; H04L 1/0063; H04J 3/1652; H04Q 11/0005; H04Q 11/0062; H04Q 2011/0045; H04Q 2011/0079
(Continued)

(56) References Cited

U.S. PATENT DOCUMENTS

| 7,028,241 B1 | 4/2006 | Blair et al. |
| 2007/0091896 A1 | 4/2007 | Liu |

(Continued)

FOREIGN PATENT DOCUMENTS

| CN | 1471251 A | 1/2004 |
| CN | 1791057 A | 6/2006 |

(Continued)

OTHER PUBLICATIONS

International Search Report issued in PCT/CN2017/118630, dated Mar. 14, 2018.
(Continued)

*Primary Examiner* — Obaidul Huq
(74) *Attorney, Agent, or Firm* — BakerHostetler

(57) ABSTRACT

The embodiments of the invention disclose a data encapsulation and transmission methods, a device, and a computer storage medium. The data encapsulation method comprises: encapsulating, according to a CPRI line bit rate at a receiving terminal and using FTN encapsulation, a frame corresponding to CPRI to be a block frame combination com-
(Continued)

S101

In each data transmission cycle, according to a CPRI line bit rate in at least one receiving end, for each receiving end, a frame corresponding to the CPRI is encapsulated into a blocky frame combination in an FTN encapsulation mode, where the blocky frame combination includes at least one blocky frame, each blocky frame includes 256 words, and each word includes a frame overhead byte and a frame payload byte

S102

Each blocky frame combination is mapped to a corresponding position in a flex tunnel for transmission according to a preset mapping position of each blocky frame combination in the transmission cycle prising at least block frame, wherein each block frame comprises 256 words, and each word comprises a frame overhead byte and a frame payload byte.

19 Claims, 5 Drawing Sheets

(52) U.S. Cl.
CPC ..... *H04Q 11/0005* (2013.01); *H04Q 11/0062* (2013.01); *H04Q 2011/0045* (2013.01); *H04Q 2011/0079* (2013.01)

(58) Field of Classification Search
USPC ........................................ 370/310, 328, 329
See application file for complete search history.

(56) References Cited

U.S. PATENT DOCUMENTS

| | | | |
|---|---|---|---|
| 2007/0104485 A1 | 5/2007 | Zhang | |
| 2012/0250738 A1* | 10/2012 | Shako | H04J 3/0641 375/219 |
| 2014/0241186 A1 | 8/2014 | Garcia | |
| 2014/0355991 A1 | 12/2014 | Cameirao et al. | |
| 2015/0180575 A1* | 6/2015 | Bruckman | H04L 7/0075 398/115 |
| 2015/0295699 A1* | 10/2015 | Joung | H04L 5/0078 370/278 |
| 2018/0034574 A1 | 2/2018 | Cavaliere et al. | |
| 2018/0124730 A1* | 5/2018 | Ruffini | H04W 56/0045 |

FOREIGN PATENT DOCUMENTS

| | | |
|---|---|---|
| CN | 101860408 A | 10/2010 |
| CN | 102118191 A | 7/2011 |
| CN | 105187161 A | 12/2015 |
| CN | 106899342 A | 6/2017 |
| EP | 2602948 A1 | 6/2013 |
| JP | 2007124608 A | 5/2007 |
| JP | 2010539828 A | 12/2010 |
| JP | 2015510704 A | 4/2015 |
| JP | 2015133555 A | 7/2015 |
| WO | 2016138950 A1 | 9/2016 |
| WO | 2016144083 A1 | 9/2016 |
| WO | 2016155828 A1 | 10/2016 |

OTHER PUBLICATIONS

English translation of Written Opinion issued in PCT/CN2017/118630, dated Mar. 14, 2018.
Extended Search Report issued in European Application No. 17886562.2, dated Oct. 25, 2019.
Valcarenghi et al., "Analytical and Experimental Evaluation of CPRI over Ethernet Dynamic Rate Reconfiguration" IEEE ICC 2016 Optical Networks and Systems, XP032921893, May 2016, 6 Pages.
Chitimalla et al., "Reconfigurable and Efficient Fronthaul of 5G Systems" IEEE ANTS 2015, XP032869888, Dec. 2015, 5 Pages.
First Office Action issued in Japanese Application No. 2019-527144, dated Aug. 18, 2020.
First Office Action issued in Korean Application No. 10-2019-7015157, dated Sep. 18, 2020.
Hirano et al., "Optical Access Network Technology to Accommodate Centralized Radio Access Network" Information Technology R&D Center, Mitsubishi Electric Corporation, 2015, pp. SS-61-SS-62.

* cited by examiner

| Byte combination: N bytes | | |
|---|---|---|
| Two bytes: byte 1 and byte 2 | (N-2) bytes | |
| Frame overhead byte | Frame payload byte | Byte combination-0 |
| Frame overhead byte | Frame payload byte ... ... | Byte combination-1 |
| Frame overhead byte | Frame payload byte | Byte combination-2 |
| ⋮ | ⋮ | Blocky frame1 |
| Frame overhead byte | Frame payload byte | Byte combination-254 |
| Frame overhead byte | Frame payload byte | Byte combination-255 |
| Frame overhead byte | Frame payload byte | Byte combination-0 |
| Frame overhead byte | Frame payload byte ... ... | Byte combination-1 |
| Frame overhead byte | Frame payload byte | Byte combination-2 |
| ⋮ | ⋮ | Blocky frame2 |
| Frame overhead byte | Frame payload byte | Byte combination-254 |
| Frame overhead byte | Frame payload byte | Byte combination-255 |

FIG. 1

| One byte: byte 1 | 16 bytes | |
|---|---|---|
| \<-- Byte combination: 17 bytes --\> | | |
| Frame overhead byte | Frame payload byte | Byte combination-0 |
| Frame overhead byte | Frame payload byte ... ... | Byte combination-1 |
| Frame overhead byte | Frame payload byte | Byte combination-2 |
| ⋮ | ⋮ | Blocky frame1 |
| Frame overhead byte | Frame payload byte | Byte combination-254 |
| Frame overhead byte | Frame payload byte | Byte combination-255 |
| Frame overhead byte | Frame payload byte | Byte combination-0 |
| Frame overhead byte | Frame payload byte ... ... | Byte combination-1 |
| Frame overhead byte | Frame payload byte | Byte combination-2 |
| ⋮ | ⋮ | Blocky frame2 |
| Frame overhead byte | Frame payload byte | Byte combination-254 |
| Frame overhead byte | Frame payload byte | Byte combination-255 |

FIG. 2

| One byte: byte 1 | 16 bytes | | |
|---|---|---|---|
| | byte 2 | ... ... Byte combination-0 | byte 17 |
| Frame synchronization byte | | | |
| Frame synchronization byte | Frame payload byte | Byte combination-1 | |
| ... ... | | | |
| Frame synchronization byte | Frame payload byte | Byte combination-5 | |
| GCC byte | Frame payload byte | Byte combination-6 | |
| BIP byte | Frame payload byte | Byte combination-7 | |
| ... ... | | | |
| BIP byte | Frame payload byte | Byte combination-9 | |
| FEC frame payload byte | Frame payload byte | Byte combination-10 | |
| ... ... | | | |
| FEC frame payload byte | Frame payload byte | Byte combination-153 | |
| OAM byte | Frame payload byte | Byte combination-154 | |
| ... ... | | | |
| OAM byte | Frame payload byte | Byte combination-225 | |
| Synchronization byte | Frame payload byte | Byte combination-226 | |
| FEC frame overhead byte | Frame payload byte | Byte combination-227 | |
| ... ... | | | |
| FEC frame overhead byte | Frame payload byte | Byte combination-252 | |
| RES byte | Frame payload byte | Byte combination-253 | |
| ... ... | | | |
| RES byte | Frame payload byte | Byte combination-255 | |

(17 bytes total)

FIG. 3

| CPRI line bit rate | Number of corresponding blocky frames | Payload rate (Mbps) | Rate after encapsulation (Mbps) |
|---|---|---|---|
| Option 1 | 1 | 491.52 | 522.24 |
| Option 2 | 2 | 983.04 | 1044.48 |
| Option 3 | 4 | 1966.08 | 2088.96 |
| Option 4 | 5 | 2457.6 | 2611.2 |
| Option 5 | 8 | 3932.16 | 4177.92 |
| Option 6 | 10 | 4915.2 | 5222.4 |
| Option 7 | 16 | 7864.32 | 8355.84 |
| Option 7A | 16 | 7864.32 | 8355.84 |
| Option 8 | 20 | 9830.4 | 10444.8 |
| Option 9 | 24 | 11796.48 | 12533.76 |
| Option 10 | 48 | 23592.96 | 25067.52 |

In each data transmission cycle, according to a CPRI line bit rate in at least one receiving end, for each receiving end, a frame corresponding to the CPRI is encapsulated into a blocky frame combination in an FTN encapsulation mode, where the blocky frame combination includes at least one blocky frame, each blocky frame includes 256 words, and each word includes a frame overhead byte and a frame payload byte

S102

Each blocky frame combination is mapped to a corresponding position in a flex tunnel for transmission according to a preset mapping position of each blocky frame combination in the transmission cycle

DATA ENCAPSULATION AND TRANSMISSION METHODS, DEVICE, AND COMPUTER STORAGE MEDIUM

CROSS-REFERENCE TO RELATED APPLICATIONS

The present application is a National Stage of International Patent Application No. PCT/CN2017/118630, filed on Dec. 26, 2017, and claims benefit of Chinese Patent Application No. 201611229086.0, filed on Dec. 27, 2016, the contents of which are hereby incorporated by reference in their entirety.

TECHNICAL FIELD

The disclosure relates to the field of data transmission, and in particular to data encapsulation and transmission methods, device, and computer storage medium.

BACKGROUND

Currently, a common public radio interface (CPRI) is mainly utilized to connect a baseband processing unit (BBU) and a radio remote unit (RRU). A frame corresponding to the CPRI has a corresponding frame structure. The frame corresponding to the CPRI carries data information to be transmitted by a user, and the frame corresponding to the CPRI is often mapped to an optical transport network (OTN) for transmission. In order to adapt to various customer services, such as SDH, Ethernet, FC, rich overhead and transmission modes have been designed in the OTN. In addition, in order to ensure long-distance and high-quality transmission, for example, high-intensity forward error correction (FEC) and multiple levels of tandem connection monitoring (TCM) are designed.

The frames corresponding to the CPRI are encapsulated in time division multiplexing (TDM) to form a hyper frame having a period of 1/3.84 Mhz. The hyper frame contains 256 sub-frames. A first byte combination (word) of each sub-frame is a control word, which is used to carry control management plane and synchronization information. The remaining 15 words are used to carry user plane data. The hyper frame has a complex structure. A main application scenario of the frames corresponding to CPRI is point-to-point transmission, and a distance is generally within 30 km. The hyper frame that is encapsulated in TDM is mapped to the OTN for transmission. Because of the complex structure of the hyper frame, as well as a complex transmission mechanism, a networking mechanism and a long-distance transmission mechanism in OTN, an efficiency for transmission of the hyper frame is low, and a transmission delay is not reduced. On the contrary, an end-to-end transmission delay may be uncontrollable.

SUMMARY

Embodiments of the disclosure provide methods and devices for data encapsulation and transmission and a computer storage medium, which are used to solve the problem that a hyper frame for a CPRI has a complex structure, and the transmission efficiency is low and the transmission delay is uncontrollable when the hyper frame is mapped to the OTN for transmission.

To achieve the above objective, an embodiment of the present disclosure provides a method for data encapsulation, where the method for data encapsulation includes the following operations.

According to a CPRI line bit rate at a receiving end, the frame corresponding to the CPRI is encapsulated into a blocky frame combination in a front-haul transport network (FTN) encapsulation mode. The blocky frame combination includes at least one blocky frame. Each blocky frame includes 256 words, and each word includes a frame overhead byte and a frame payload byte.

In an embodiment, the frame overhead byte included in each word occupies one byte, and the frame payload byte included in each word occupies 16 bytes.

In an embodiment, the blocky frame includes at least one type of the following frame overhead bytes:

a frame synchronization byte, a general communication channel (GCC) byte, a bit interleaved parity (BIP) byte, a forward error correction (FEC) frame payload byte, an operation administration and maintenance (OAM) byte, a synchronization byte, an FEC frame overhead byte and a reserved (RES) byte.

In an embodiment, when the frame overhead bytes included in the blocky frame include the frame synchronization byte, the GCC byte, the BIP byte, the FEC frame payload byte, the OAM byte, the synchronization byte, the FEC frame overhead byte and the RES byte, the frame overhead bytes in a first word to a sixth word in the blocky frame are the frame synchronization bytes; the frame overhead byte in a seventh word in the blocky frame is the GCC byte; the frame overhead bytes in an eighth word to a tenth word in the blocky frame are the BIP bytes; the frame overhead bytes in an eleventh word to a 154th word in the blocky frame are the FEC frame payload bytes; the frame overhead bytes in a 155th word to a 226th word in the blocky frame are the OAM bytes; the frame overhead byte in a 227th word in the blocky frame is a synchronization byte; the frame overhead bytes in a 228th word to a 253th word in the blocky frame are the FEC frame overhead bytes; and the frame overhead bytes in a 254th word to a 256th word in the blocky frame are the RES bytes.

In an embodiment, the operation that according to the CPRI line bit rate at the current receiving end, the frame corresponding to the CPRI is encapsulated into a blocky frame combination in the FTN encapsulation mode, includes the following actions. When the CPRI line bit rate at the receiving end is Option 1, the frame corresponding to the CPRI is encapsulated into a blocky frame combination including one blocky frame in the FTN encapsulation mode. When the CPRI line bit rate at the receiving end is Option 2, the frame corresponding to the CPRI is encapsulated into a blocky frame combination including two blocky frames in the FTN encapsulation mode. When the CPRI line bit rate at the receiving end is Option 3, the frame corresponding to the CPRI is encapsulated into a blocky frame combination including four blocky frames in the FTN encapsulation mode. When the CPRI line bit rate at the receiving end is Option 4, the frame corresponding to the CPRI is encapsulated into a blocky frame combination including five blocky frames in the FTN encapsulation mode. When the CPRI line bit rate at the receiving end is Option 5, the frame corresponding to the CPRI is encapsulated into a blocky frame combination including eight blocky frames in the FTN encapsulation mode. When the CPRI line bit rate at the receiving end is Option 6, the frame corresponding to the CPRI is encapsulated into a blocky frame combination including ten blocky frames in the FTN encapsulation mode. When the CPRI line bit rate at the receiving end is Option 7 or 7A, the frame corresponding to the CPRI is encapsulated into a blocky frame combination including 16 blocky frames in the FTN encapsulation mode. When the CPRI line bit rate at the receiving end is Option 8, the frame corresponding to the CPRI is encapsulated into a blocky frame combination including 20 blocky frames in the FTN encapsulation mode. When the CPRI line bit rate at the receiving end is Option 9, the frame corresponding to the CPRI is encapsulated into a blocky frame combination including 24 blocky frames in the FTN encapsulation mode. When the CPRI line bit rate at the receiving end is Option 10, the frame corresponding to the CPRI is encapsulated into a blocky frame combination including 48 blocky frames in the FTN encapsulation mode.

The embodiment of the present disclosure provides a method for data transmission based on the method for data encapsulation, and the method for data transmission includes the following operations.

In each data transmission cycle, according to a CPRI line bit rate in at least one receiving end, for each receiving end, the frame corresponding to the CPRI is encapsulated into a blocky frame combination in an FTN encapsulation mode. The blocky frame combination includes at least one blocky frame, each blocky frame includes 256 words, and each word includes a frame overhead byte and a frame payload byte.

Each blocky frame combination is mapped to a corresponding position in a flex tunnel for transmission according to a preset mapping position of each blocky frame combination in the transmission cycle.

The embodiment of the present disclosure further discloses a device for data encapsulation, the device for data encapsulation includes a storage module and an encapsulation module.

The storage module is configured to save a CPRI line bit rate at a receiving end.

The encapsulation module is configured to encapsulate, according to the CPRI line bit rate at the receiving end, the frame corresponding to the CPRI into a blocky frame combination in an FTN encapsulation mode. The blocky frame combination includes at least one blocky frame, each blocky frame includes 256 words, and each word includes a frame overhead byte and a frame payload byte.

In an embodiment, the encapsulation module is configured to, when the frame overhead bytes included in the encapsulated blocky frame include a frame synchronization byte, a GCC byte, a BIP byte, an FEC frame payload byte, an OAM byte, a synchronization byte, an FEC frame overhead byte and an RES byte, set the frame overhead bytes in a first word to a sixth word in the blocky frame to the frame synchronization bytes; set the frame overhead byte in a seventh word in the blocky frame to the GCC byte; set the frame overhead bytes in an eighth word to a tenth word in the blocky frame to the BIP bytes; set the frame overhead bytes in an eleventh word to a 154th word in the blocky frame to the FEC frame payload bytes; set the frame overhead bytes in a 155th word to a 226th word in the blocky frame to the OAM bytes; set the frame overhead byte in a 227th word in the blocky frame to the synchronization byte; set the frame overhead bytes in a 228th word to a 253th word in the blocky frame to the FEC frame overhead bytes; and set the frame overhead bytes in a 254th word to a 256th word in the blocky frame to the RES bytes.

In an embodiment, the encapsulation module is configured to, when the CPRI line bit rate at the receiving end is Option 1, encapsulate the frame corresponding to the CPRI into a blocky frame combination including one blocky frame in the FTN encapsulation mode. When the CPRI line bit rate at the receiving end is Option 2, the encapsulation module is configured to encapsulate the frame corresponding to the CPRI into a blocky frame combination including two blocky frames in the FTN encapsulation mode. When the CPRI line bit rate at the receiving end is Option 3, the encapsulation module is configured to encapsulate the frame corresponding to the CPRI into a blocky frame combination including four blocky frames in the FTN encapsulation mode. When the CPRI line bit rate is Option 4, the encapsulation module is configured to encapsulate the frame corresponding to CPRI into a blocky frame combination including five blocky frames in the FTN encapsulation mode. When the CPRI line bit rate at the receiving end is Option 5, the encapsulation module is configured to encapsulate the frame corresponding to the CPRI into a blocky frame combination including eight blocky frames in the FTN encapsulation mode. When the CPRI line bit rate at the receiving end is Option 6, the encapsulation module is configured to encapsulate the frame corresponding to the CPRI into a blocky frame combination including 10 blocky frames in the FTN encapsulation mode. When the CPRI line bit rate at the receiving end is Option 7 or 7A, the encapsulation module is configured to encapsulate the frame corresponding to the CPRI into a blocky frame combination including 16 blocky frames in the FTN encapsulation mode. When the CPRI line bit rate at the receiving end is Option 8, the encapsulation module is configured to encapsulate the frame corresponding to the CPRI into a blocky frame combination including 20 blocky frames in the FTN encapsulation mode. When the CPRI line bit rate at the receiving end is Option 9, the encapsulation module is configured to encapsulate the frame corresponding to the CPRI into a blocky frame including 24 blocky frames in the FTN encapsulation mode. When the CPRI line bit rate at the receiving end is Option 10, the encapsulation module is configured to encapsulate the frame corresponding to the CPRI into a blocky frame combination including 48 blocky frames in the FTN encapsulation mode.

The embodiment of the present disclosure further discloses a device for data transmission based on the device for data encapsulation, and the device for data transmission includes an encapsulation module and a transmission module.

The encapsulation module is configured to, in each data transmission cycle, according to the CPRI line bit rate of the at least one receiving end, for each receiving end, encapsulate the frame corresponding to the CPRI into a blocky frame combination in an FTN encapsulation mode. The blocky frame combination includes at least one blocky frame, each blocky frame includes 256 words, and each word includes a frame overhead byte and a frame payload byte.

The transmission module is configured to map each blocky frame combination to a corresponding position in a flex tunnel for transmission according to a preset mapping position of each blocky frame combination in the transmission cycle.

The embodiment of the present disclosure further provides a computer storage medium having stored therein computer executable instructions, and the computer executable instructions are used to execute the operations of the method for data encapsulation according to the embodiment of the present disclosure.

Alternatively, the computer executable instructions are used to perform the operations of the method for data transmission according to the embodiment of the present disclosure.

The embodiment of the present disclosure further provides a device for data encapsulation, which includes a processor and a memory for storing a computer program executable on the processor. The processor is configured to execute the operations of the method for data encapsulation in the embodiments of the present disclosure when running the computer program.

The embodiment of the present disclosure further provides a device for data transmission based on the device for data encapsulation according to the embodiment of the present disclosure, which includes a processor and a memory for storing a computer program executable on the processor. The processor is configured to execute the operations of the method for data transmission in the embodiment of the present disclosure when running the computer program.

Embodiments of the present disclosure provide methods and devices for data encapsulation and transmission and a computer storage medium. The method for data encapsulation includes the following operations. According to the CPRI line bit rate at the receiving end, the frame corresponding to the CPRI is encapsulated into a blocky frame combination in an FTN encapsulation mode. The blocky frame combination includes at least one blocky frame, each blocky frame includes 256 words, and each word includes a frame overhead byte and a frame payload byte. In the embodiments of the present disclosure, FTN encapsulation is performed according to the CPRI line bit rate at the current receiving end, and the encapsulated blocky frame combination includes at least one blocky frame, which can satisfy encapsulation and transmission for the CPRI at any rate. The blocky frame has a fixed frame length, each blocky frame includes 256 words, and each word includes a frame overhead byte and a frame payload byte. The encapsulated frame has a simple structure, thereby effectively reducing an end-to-end transmission delay and improving a transmission efficiency.

BRIEF DESCRIPTION OF DRAWINGS

In order to more clearly illustrate the technical solutions of the embodiments of the present disclosure or the related art, the drawings used in the description of the embodiments or the related art will be briefly described below. Apparently, the drawings in the following description only illustrate some embodiments of the present disclosure. Those skilled in the art can further obtain other drawings according to the drawings without any creative work.

FIG. 1 is a schematic diagram showing a frame structure of an encapsulated blocky frame combination according to a first embodiment of the present disclosure;

FIG. 2 is a schematic diagram showing a frame structure of an encapsulated blocky frame combination according to a second embodiment of the present disclosure;

FIG. 3 is a schematic diagram showing a frame structure of an encapsulated blocky frame combination according to a third embodiment of the present disclosure;

FIG. 4 is a schematic diagram showing correspondences between a CPRI line bit rate and a blocky frame and a corresponding rate according to a fourth embodiment of the present disclosure;

FIG. 5 is a schematic diagram showing a data transmission process according to a fifth embodiment of the present disclosure;

DETAILED DESCRIPTION

Figure 6:
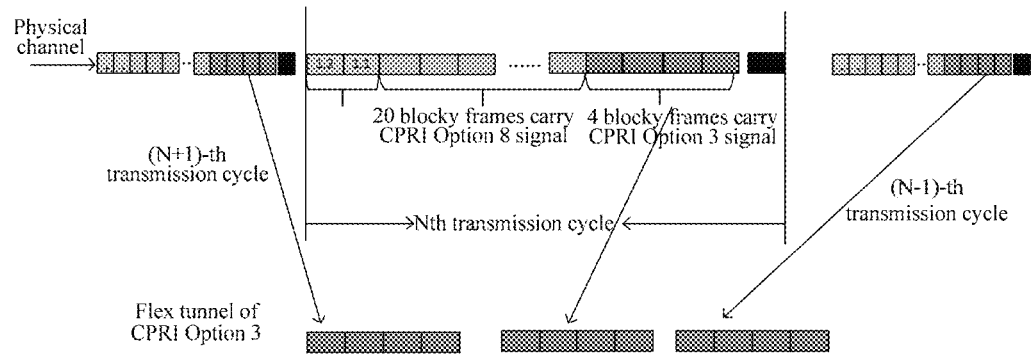
FIG. 6 is a schematic diagram showing a process of transmitting a blocky frame combination in a flex tunnel according to an embodiment of the present disclosure.

In order to reduce an end-to-end transmission delay and improve a transmission efficiency, embodiments of the present disclosure provide methods and devices for data encapsulation and transmission, and a computer storage medium.

The technical solutions in the embodiments of the present disclosure are clearly and completely described in the following with reference to the accompanying drawings in the embodiments of the present disclosure. It is apparent that the described embodiments are a part of the embodiments of the present disclosure rather than all of the embodiments. All other embodiments obtained by those skilled in the art based on the embodiments of the present disclosure without any creative work fall within the scope of protection of the present disclosure.

First Embodiment

In order to reduce the transmission delay, a frame structure after data encapsulation is simplified. In the embodiment of the present disclosure, the method for data encapsulation includes the following operation.

According to a CPRI line bit rate at a receiving end, a frame corresponding to the CPRI is encapsulated into a blocky frame combination in an FTN encapsulation mode. The blocky frame combination includes at least one blocky frame, each blocky frame includes 256 words, and each word includes a frame overhead byte and a frame payload byte.

In the embodiment of the present disclosure, the frame corresponding to the CPRI is encapsulated into the blocky frame combination by using FTN encapsulation. The blocky frame combination includes at least one blocky frame, each blocky frame includes 256 words, and each word includes a frame overhead byte and a frame payload byte. Each word may include at least one byte. The frame overhead byte may occupy any byte in the word, and the frame payload byte may occupy any byte in the word. The number of bytes occupied by the frame overhead byte in each of the 256 words may be the same or different. The number of bytes occupied by the frame payload byte may be the same or different. A total number of bytes occupied by the frame overhead byte and the frame payload byte is not greater than the number of bytes included in each word.

In addition, since the CPRI at the receiving end has various line bit rates, each line bit rate corresponds to a respective CPRI rate. The higher the line bit rate, the higher the corresponding CPRI rate, and the more data content of the transmitted frame corresponding to the CPRI will be. The frame corresponding to the CPRI is encapsulated into a blocky frame combination by using FTN encapsulation, and the blocky frame combination includes at least one blocky frame. The data content in each blocky frame is the data content of the frame corresponding to the CPRI transmitted by a CPRI rate corresponding to the minimum rate in the CPRI rates, the minimum rate is 614.4 Mbps, that is, the CPRI line bit rate is Option 1. When the CPRI line bit rate is high, the blocky frame combination may contain an integer number of blocky frames. For CPRI having different line bit rates, the frame length and format of the blocky frame are the same. For the CPRI having a high line bit rate and a high speed, multiple blocky frames are used for bearer.

Therefore, the above encapsulation can satisfy the encapsulation and bearer for the CPRI having any rate.

FIG. 1 is a schematic diagram showing a frame structure of the blocky frame combination after data encapsulation according to the first embodiment of the present disclosure. As illustrated in FIG. 1, the blocky frame combination includes two blocky frames, i.e., a blocky frame 1 and a blocky frame 2. Each blocky frame includes 256 words, and the 256 words are word-0 to word-255. Each word includes N bytes. Each word includes a frame overhead byte and a frame payload byte, and the first two bytes of each word are frame overhead bytes. The remaining bytes of each word except the frame overhead bytes are frame payload bytes. When a total number of bytes contained in the word is N, the number of bytes occupied by the frame payload byte in each word is N−2.

In the embodiment of the present disclosure, FTN encapsulation is performed according to the CPRI line bit rate at the receiving end, and the encapsulated blocky frame combination includes at least one blocky frame, which can satisfy the encapsulation and transmission for the CPRI at any rate. The blocky frame has a fixed frame length, each blocky frame includes 256 words, and each word includes a frame overhead byte and a frame payload byte. The encapsulated frame has a simple structure, thereby effectively reducing an end-to-end transmission delay and improving a transmission efficiency.

Second Embodiment

In order to make a frame structure of the encapsulated blocky frame combination simpler, on the basis of the foregoing embodiment, the frame overhead byte included in each word occupies one byte, and the frame payload byte included in each word occupies 16 bytes.

In the embodiment of the present disclosure, each word includes the frame overhead byte and the frame payload byte, and each word at least includes 17 bytes. The frame overhead byte occupies one byte, and the frame payload byte occupies 16 bytes.

FIG. 2 is a schematic diagram showing a frame structure of a blocky frame combination after data encapsulation according to the second embodiment of the present disclosure. As illustrated in FIG. 2, the blocky frame combination includes two blocky frames, i.e., a blocky frame 1 and a blocky frame 2. Each blocky frame includes 256 words, and the 256 words are word-0 to word-255. Each word includes 17 bytes. A first byte of the 17 bytes that is byte 1 is used as the frame overhead byte, and the remaining 16 bytes are used as the frame payload byte.

Third Embodiment

The frame overhead byte includes one or more types of control signaling, and each type of control signaling corresponds to one type of frame overhead byte. On the basis of the foregoing embodiments, in the embodiment of the present disclosure, the blocky frame includes at least one of the following frame overhead bytes:

a frame synchronization byte, a GCC byte, a BIP byte, an FEC frame payload byte, an OAM byte, a synchronization byte, an FEC frame overhead byte or an RES byte.

In order to ensure the accuracy and reliability of data transmission, the frame overhead byte contains various control signaling, and each type of control signaling implements a corresponding control function. Therefore, in order to distinguish each type of control signaling, the frame overhead bytes may be classified into multiple types according to control signaling included in the frame overhead byte, and the frame overhead bytes may include all kinds of frame overhead bytes described above. That is, the frame overhead bytes included in the blocky frame include the frame synchronization byte, the GCC byte, the BIP byte, the FEC frame payload byte, the OAM byte, the synchronization byte, the FEC frame overhead byte and the RES byte. Of course, the frame overhead bytes may include only one or more of the above frame overhead bytes.

FIG. 3 is a schematic diagram showing a frame structure of a blocky frame combination after data encapsulation according to the third embodiment of the present disclosure. The blocky frame illustrated in FIG. 3 includes 256 words, and the 256 words are word-0 to word-255. Each word includes 17 bytes. A first byte of the 17 bytes that is byte 1 is used as the frame overhead byte, and the remaining 16 bytes are used as the frame payload byte.

The frame overhead byte included in the blocky frame includes the frame synchronization byte, the GCC byte, the BIP byte, the FEC frame payload byte, the OAM byte, the synchronization byte, the FEC frame overhead byte and the RES byte.

The frame overhead bytes in a first word to a sixth word that are word-0 to word-5 in the blocky frame are each frame synchronization byte. The frame overhead byte in a seventh word that is word-6 in the blocky frame is the GCC byte. The frame overhead bytes in an eighth word to a tenth word that are word-7 to word-9 in the blocky frame are each BIP byte. The frame overhead bytes in an eleventh word to a 154th word that are word-10 to word-153 in the blocky frame are each FEC frame payload byte. The frame overhead bytes in a 155th word to a 226th word that are word-154 to word-225 in the blocky frame are each OAM byte. The frame overhead byte in a 227th word that is word-226 in the blocky frame is the synchronization byte. The frame overhead bytes in a 228th word to a 253th word that are word-227 to word-252 in the blocky frame are each FEC frame overhead byte. The frame overhead bytes in a 254th word to a 256th word that are word-253 to word-255 in the blocky frame are each RES byte.

In a data transmission process, the frame synchronization byte occupies six bytes for implementing frame synchronization transmission in a data stream.

The GCC byte occupies one byte for implementing transmission of the management data of the frame corresponding to the CPRI. The BIP occupies three bytes, and reference is made to the BIP calculation polynomial of OTN.

The FEC byte occupies 144 bytes for implementing forward error correction coding of the frame payload.

The OAM byte occupies 72 bytes for implementing an end-to-end OAM guarantee. The OAM frame contains fault monitoring and performance measurement, which can realize comprehensive OAM guarantee.

The synchronization byte occupies one byte for carrying a time-synchronized byte or a frequency-synchronized synchronization status marker (ssm) byte.

The FEC frame overhead byte occupies 26 bytes, and simple G-FEC is used for calculation to ensure high quality transmission.

The RES byte occupies 3 bytes for reserved use for the future.

When the frame overhead bytes included in the blocky frame contain a synchronization byte, a GCC byte, a BIP byte, an FEC frame payload byte, an OAM byte, a synchronization byte, an FEC frame overhead byte and an RES byte, for each type of frame overhead byte, the number of words in the blocky frame containing the frame overhead byte can be flexibly set as needed, and which words in the blocky frame contain the frame overhead byte can also be flexibly set. In the embodiment of the present disclosure, only a specific implementation is given. However, in actual use, it can be flexibly set according to requirements, as long as the frame overhead byte and the frame payload byte are contained in each word.

Fourth Embodiment

The CPRI at the receiving end has various line bit rates, and each line bit rate corresponds to a respective CPRI rate. The higher the line bit rate, the higher the corresponding CPRI rate, and the more data content of the transmitted frame corresponding to the CPRI will be. FIG. 4 is a schematic diagram showing correspondences between a CPRI line bit rate and a blocky frame and a corresponding rate according to the fourth embodiment of the present disclosure. Different CPRI line bit rates correspond to different numbers of blocky frames, and different CPRI line bit rates correspond to different payload rates and rates after encapsulation. The payload rate refers to a transmission rate when only the frame payload byte is contained in the blocky frame combination. The rate after encapsulation refers to a transmission rate when the blocky frame combination includes the frame overhead byte and the frame payload byte.

The operation that according to the CPRI line bit rate at the receiving end, the frame corresponding to the CPRI is encapsulated into a blocky frame combination in an FTN encapsulation mode includes the following actions.

When the CPRI line bit rate at the current receiving end is Option 1, the frame corresponding to the CPRI is encapsulated into a blocky frame combination including one blocky frame in the FTN encapsulation mode, a corresponding payload rate is 491.52 Mbps and a corresponding rate after encapsulation is 522.24 Mbps. When the CPRI line bit rate at the current receiving end is Option 2, the frame corresponding to the CPRI is encapsulated into a blocky frame combination including two blocky frames in the FTN encapsulation mode, a corresponding payload rate is 983.04 Mbps, and a corresponding rate after encapsulation is 1044.48 Mbps. When the CPRI line bit rate at the current receiving end is Option 3, the frame corresponding to the CPRI is encapsulated into a blocky frame combination including four blocky frames in the FTN encapsulation mode, a corresponding payload rate is 1966.08 Mbps, and a corresponding rate after encapsulation is 2088.96 Mbps. When the CPRI line bit rate at the current receiving end is Option 4, the frame corresponding to the CPRI is encapsulated into a blocky frame combination including five blocky frames in the FTN encapsulation mode, a corresponding payload rate is 2457.6 Mbps, and a corresponding rate after encapsulation is 2611.2 Mbps. When the CPRI line bit rate at the current receiving end is Option 5, the frame corresponding to the CPRI is encapsulated into a blocky frame combination including eight blocky frames in the FTN encapsulation mode, a corresponding payload rate is 3932.16 Mbps, and a corresponding rate after encapsulation is 4177.92 Mbps. When the CPRI line bit rate at the current receiving end is Option 6, the frame corresponding to the CPRI is encapsulated into a blocky frame combination including 10 blocky frames in the FTN encapsulation mode, a corresponding payload rate is 4915.2 Mbps, and a corresponding rate after encapsulation is 5222.4 Mbps. When the CPRI line bit rate at the current receiving end is Options 7 and 7A, the frame corresponding to the CPRI is encapsulated into a blocky frame combination including 16 blocky frames in the FTN encapsulation mode, a corresponding payload rate is 7864.32 Mbps, and a corresponding rate after encapsulation is 8355.84 Mbps. When the CPRI line bit rate at the current receiving end is Option 8, the frame corresponding to the CPRI is encapsulated into a blocky frame combination including 20 blocky frames in the FTN encapsulation mode, a corresponding payload rate is 9830.4 Mbps, and a corresponding rate after encapsulation is 10444.8 Mbps. When the CPRI line bit rate at the receiving end is Option 9, the frame corresponding to the CPRI is encapsulated into a blocky frame combination including 24 blocky frames in the FTN encapsulation mode, a corresponding payload rate is 11796.48 Mbps, and a corresponding rate after encapsulation is 12533.76 Mbps. When the CPRI line bit rate at the receiving end is Option 10, the frame corresponding to the CPRI is encapsulated into a blocky frame combination including 48 blocky frames in the FTN encapsulation mode, a corresponding payload rate is 23592.96 Mbps, and a corresponding rate after the encapsulation is 25067.52 Mbps. When there are other new selections for the CPRI line bit rate, the line bit rate is mapped to a corresponding blocky frame combination by using the same mapping method.

When the CPRI line bit rate is high, the blocky frame combination may contain an integer number of blocky frames. For the CPRI having different line bit rates, the frame length and format of the blocky frame are the same. For the CPRI having a high line bit rate and a high speed, multiple blocky frames are used for bearer. Therefore, the above encapsulation can satisfy the encapsulation and bearer for the CPRI having any rate.

Fifth Embodiment

FIG. 5 is a schematic diagram showing a data transmission process according to the fifth embodiment of the present disclosure. The process includes the following operations.

At block S101, in each data transmission cycle, according to a CPRI line bit rate in at least one receiving end, for each receiving end, the frame corresponding to the CPRI is encapsulated into a blocky frame combination in an FTN encapsulation mode. The blocky frame combination includes at least one blocky frame, each blocky frame includes 256 words, and each word includes a frame overhead byte and a frame payload byte.

In the embodiment of the present disclosure, when there is only one receiving end, the method for data transmission may be an end-to-end transmission. When there are multiple receiving ends, the method for data transmission may be an end-to-multi-end transmission. A transmitting end can transmit data to the receiving end, where the transmitting end stores a CPRI line bit rate for each receiving end and a cycle of transmitting data to the receiving end. A length of each transmission cycle is determined according to the number of receiving ends and the amount of data transmitted with each receiving end in each cycle. The transmission durations assigned to the respective receiving ends in each transmission cycle are the same or different.

In each data transmission cycle, according to the CPRI line bit rate at the receiving end, a frame corresponding to the CPRI that needs to be transmitted currently is encapsulated in an FTN encapsulation mode, and an encapsulated blocky frame combination is obtained. The blocky frame combination includes at least one blocky frame, each blocky frame includes 256 words, and each word includes a frame overhead byte and a frame payload byte. That is to say, a blocky frame combination corresponding to the receiving end is encapsulated for each receiving end.

When the CPRI line bit rate at the receiving end is Option 1, the frame corresponding to the CPRI is encapsulated into a blocky frame combination including one blocky frame in the FTN encapsulation mode. When the CPRI line bit rate at the receiving end is Option 2, the frame corresponding to the CPRI is encapsulated into a blocky frame combination including two blocky frames in the FTN encapsulation mode. When the CPRI line bit rate at the receiving end is Option 3, the frame corresponding to the CPRI is encapsulated into a blocky frame combination including four blocky frames in the FTN encapsulation mode. When the CPRI line bit rate at the receiving end is Option 4, the frame corresponding to the CPRI is encapsulated into a blocky frame combination including five blocky frames. When the CPRI line bit rate at the receiving end is Option 5, the frame corresponding to the CPRI is encapsulated into a blocky frame combination including eight blocky frames in the FTN encapsulation mode. When the CPRI line bit rate at the receiving end is Option 6, the frame corresponding to the CPRI is encapsulated into a blocky frame combination including 10 blocky frames in the FTN encapsulation mode. When the CPRI line bit rate at the receiving end is Options 7 and 7A, the frame corresponding to the CPRI is encapsulated into a blocky frame combination including 16 blocky frames in the FTN encapsulation mode. When the CPRI line bit rate at the receiving end is Option 8, the frame corresponding to the CPRI is encapsulated into a blocky frame combination including 20 blocky frames in the FTN encapsulation mode. When the CPRI line bit rate at the receiving end is Option 9, the frame corresponding to the CPRI is encapsulated into a blocky frame including 24 blocky frames in the FTN encapsulation mode. When the CPRI line bit rate at the receiving end is Option 10, the frame corresponding to the CPRI is encapsulated into a blocky frame combination including 48 blocky frames in the FTN encapsulation mode.

The payload rate refers to a transmission rate when only the frame payload byte is contained in the blocky frame combination. The rate after encapsulation refers to a transmission rate when the blocky frame combination includes the frame overhead byte and the frame payload byte.

At block S102, each blocky frame combination is mapped to a corresponding position in a flex tunnel for transmission according to a preset mapping position of each blocky frame combination in the transmission cycle.

A mapping position of each blocky frame combination in the data transmission cycle is stored in the transmitting end. After the blocky frame combination corresponding to the receiving end is obtained for each receiving end, according to the pre-stored mapping position of each blocky frame combination, the blocky frame combination is mapped to a corresponding position in the flex tunnel for transmission. The mapping position for data transmission between the transmitting end and each receiving end in each time cycle is the same.

In addition to transmitting the blocky frame combination encapsulated by using the FTN encapsulation, the flex tunnel can also transmit a blocky frame encapsulated by using TDM encapsulation and a blocky frame of an Ethernet signal.

FIG. 6 is a schematic diagram showing a transmission process of a blocky frame combination in a flex tunnel. Each flex tunnel is a physical channel. In each data transmission cycle, the transmitting end transmits data to three receiving ends. FIG. 6 specifically provides a schematic diagram showing a data transmission process in the Nth transmission cycle. The Nth transmission cycle may be any one of the transmission cycles in the transmission process, and a transmission condition in each transmission cycle is the same as the data transmission process in the Nth transmission cycle.

Specifically, in each data transmission cycle, the transmitting end transmits data to the three receiving ends. For a first receiving end, the CPRI line bit rate at the receiving end is Option 2, and the frame corresponding to the CPRI is encapsulated into a blocky frame combination including two blocky frames in the FTN encapsulation mode. When performing data transmission with a second receiving end, the CPRI line bit rate for the second receiving end is Option 8. The frame corresponding to the CPRI is encapsulated into a blocky frame combination in an FTN encapsulation mode, and the blocky frame combination includes 20 blocky frames. When performing data transmission with a third receiving end, the CPRI line bit rate for the third receiving end is Option 3. The frame corresponding to the CPRI is encapsulated into a blocky frame combination in an FTN encapsulation mode, and the blocky frame combination includes four blocky frames.

Each blocky frame combination is mapped to a corresponding position in the flex tunnel for transmission according to a preset mapping position of the blocky frame combination in the transmission cycle. The blocky frame combination after mapping is illustrated in FIG. 6. The transmission cycle after mapping includes a blocky frame combination including two blocky frames, a blocky frame combination including 20 blocky frames, and a blocky frame combination including four blocky frames.

In order to facilitate subsequent transmission, corresponding resources can also be reserved in each transmission cycle to meet the data transmission requirements when an unexpected situation occurs.

For each receiving end, a blocky frame combination sent to itself is acquired in each transmission cycle according to a preset mapping position of each blocky frame combination in the transmission cycle.

A data transmission network architecture corresponding to the data transmission process in the embodiment of the present disclosure may include multiple flex tunnels. The construction of the flex tunnel is completed by a multi-layer controller through centralized path calculation and configuration. Based on the specific number and time slot of the flex tunnels for each section, configuration of the flex tunnels between two interconnected nodes are realized through a centralized path calculation.

Figure 7:
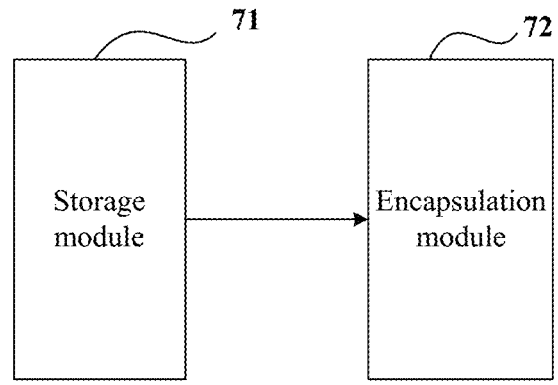
FIG. 7 is a structural diagram showing a device for data encapsulating according to a first embodiment of the present disclosure.

FIG. 7 is a structural diagram of a device for data encapsulating according to a first embodiment of the present disclosure. The device includes a storage module 71 and an encapsulation module 72.

The storage module 71 is configured to save a CPRI line bit rate at a receiving end.

The encapsulation module 72 is configured to encapsulate, according to the CPRI line bit rate at the receiving end, a frame corresponding to the CPRI into a blocky frame combination by using an FTN encapsulation mode. The blocky frame combination includes at least one blocky frame, each blocky frame includes 256 words, and each word includes a frame overhead byte and a frame payload byte.

The encapsulation module 72 is configured to, when the frame overhead bytes included in the encapsulated blocky frame include a frame synchronization byte, a GCC byte, a BIP byte, an FEC frame payload byte, an OAM byte, a synchronization byte, an FEC frame overhead byte and an RES byte, set the frame overhead bytes in a first word to a sixth word in the blocky frame to the frame synchronization bytes; set the frame overhead byte in a seventh word in the blocky frame to the GCC byte; set the frame overhead bytes in an eighth word to a tenth word in the blocky frame to the BIP bytes; set the frame overhead bytes in an eleventh word to a 154th word in the blocky frame to the FEC frame payload bytes; set the frame overhead bytes in an 155th word to a 226th word in the blocky frame to the OAM bytes; set the frame overhead byte in a 227th word in the blocky frame to the synchronization byte; set the frame overhead bytes in a 228th word to a 253th word in the blocky frame to the FEC frame overhead bytes; and set the frame overhead bytes in a 254th word to a 256th word in the blocky frame to the RES bytes.

The encapsulation module 72 is configured to, when the CPRI line bit rate at the receiving end is Option 1, encapsulate the frame corresponding to the CPRI into a blocky frame combination including one blocky frame in the FTN encapsulation mode. When the CPRI line bit rate at the receiving end is Option 2, the encapsulation module is configured to encapsulate the frame corresponding to the CPRI into a blocky frame combination including two blocky frames in the FTN encapsulation mode. When the CPRI line bit rate at the receiving end is Option 3, the encapsulation module is configured to encapsulate the frame corresponding to the CPRI into a blocky frame combination including four blocky frames in the FTN encapsulation mode. When the CPRI line bit rate at the receiving end is Option 4, the encapsulation module is configured to encapsulate the frame corresponding to the CPRI into a blocky frame combination including five blocky frames in the FTN encapsulation mode. When the CPRI line bit rate at the receiving end is Option 5, the encapsulation module is configured to encapsulate the frame corresponding to the CPRI into a blocky frame combination including eight blocky frames in the FTN encapsulation mode. When the CPRI line bit rate at the receiving end is Option 6, the encapsulation module is configured to encapsulate the frame corresponding to the CPRI into a blocky frame combination including 10 blocky frames in the FTN encapsulation mode. When the CPRI line bit rate at the receiving end is Option 7 or 7A, the encapsulation module is configured to encapsulate the frame corresponding to the CPRI into a blocky frame combination including 16 blocky frames in the FTN encapsulation mode. When the CPRI line bit rate at the receiving end is Option 8, the encapsulation module is configured to encapsulate the frame corresponding to the CPRI into a blocky frame combination including 20 blocky frames in the FTN encapsulation mode. When the CPRI line bit rate at the receiving end is Option 9, the encapsulation module is configured to encapsulate the frame corresponding to the CPRI into a blocky frame including 24 blocky frames in the FTN encapsulation mode. When the CPRI line bit rate at the receiving end is Option 10, the encapsulation module is configured to encapsulate the frame corresponding to the CPRI into a blocky frame combination including 48 blocky frames in the FTN encapsulation mode.

It should be noted that, when the device for data encapsulation in the foregoing embodiment performs data encapsulation, only the division of each of the foregoing program modules is illustrated. In actual applications, the processing may be allocated to be completed by different program modules as needed. That is, an internal structure of the device may be divided into different program modules to complete all or part of the processing described above. In addition, the device for data encapsulation and the method for data encapsulation in the foregoing embodiments are in the same concept, and the specific implementation process is described in detail in the method embodiment, and details are not described herein again.

Embodiments of the present disclosure further provide a device for data encapsulation, which includes a processor and a memory storing a computer program executable by the processor. The processor is configured to execute the following operations when running the computer program. According to the CPRI line bit rate at the receiving end, the frame corresponding to the CPRI is encapsulated into a blocky frame combination in an FTN encapsulation mode. The blocky frame combination includes at least one blocky frame. Each blocky frame includes 256 words, and each word includes a frame overhead byte and a frame payload byte.

In an embodiment, the processor is configured to execute the following operations when running the computer program. When the frame overhead bytes included in the encapsulated blocky frame include a frame synchronization byte, a GCC byte, a BIP byte, an FEC frame payload byte, an OAM byte, a synchronization byte, an FEC frame overhead byte and an RES byte, the frame overhead bytes in a first word to a sixth word in the blocky frame are set to the frame synchronization bytes; the frame overhead byte in a seventh word in the blocky frame is set to the GCC byte; the frame overhead bytes in an eighth word to a tenth word in the blocky frame are set to the BIP bytes; the frame overhead bytes in an eleventh word to a 154th word in the blocky frame are set to the FEC frame payload bytes; the frame overhead bytes in a 155th word to a 226th word in the blocky frame are set to the OAM bytes; the frame overhead byte in a 227th word in the blocky frame is set to a synchronization byte; the frame overhead bytes in a 228th word to a 253th word in the blocky frame are set to the FEC frame overhead bytes; and the frame overhead bytes in a 254th word to a 256th word in the blocky frame are set to the RES bytes.

In an embodiment, the processor is configured to execute the following operations when running the computer program. When the CPRI line bit rate at the receiving end is Option 1, the frame corresponding to the CPRI is encapsulated into a blocky frame combination including one blocky frame in the FTN encapsulation mode. When the CPRI line bit rate at the receiving end is Option 2, the frame corresponding to the CPRI is encapsulated into a blocky frame combination including two blocky frames in the FTN encapsulation mode. When the CPRI line bit rate at the receiving end is Option 3, the frame corresponding to the CPRI is encapsulated into a blocky frame combination including four blocky frames in the FTN encapsulation mode. When the CPRI line bit rate at the receiving end is Option 4, the frame corresponding to CPRI is encapsulated into a blocky frame combination including five blocky frames in the FTN encapsulation mode. When the CPRI line bit rate at the receiving end is Option 5, the frame corresponding to the CPRI is encapsulated into a blocky frame combination including eight blocky frames in the FTN encapsulation mode. When the CPRI line bit rate at the receiving end is Option 6, the frame corresponding to the CPRI is encapsulated into a blocky frame combination including 10 blocky frames in the FTN encapsulation mode. When the CPRI line bit rate at the receiving end is Option 7 or 7A, the frame corresponding to the CPRI is encapsulated into a blocky frame combination including 16 blocky frames in the FTN encapsulation mode. When the CPRI line bit rate at the receiving end is Option 8, the frame corresponding to the CPRI is encapsulated into a blocky frame combination including 20 blocky frames in the FTN encapsulation mode. When the CPRI line bit rate at the receiving end is Option 9, the frame corresponding to the CPRI is encapsulated into a blocky frame combination including 24 blocky frames in the FTN encapsulation mode. When the CPRI line bit rate at the receiving end is Option 10, the frame corresponding to the CPRI is encapsulated into a blocky frame combination including 48 blocky frames in the FTN encapsulation mode.

Embodiments of the present disclosure further provide a computer storage medium having stored thereon computer executable instructions. The computer executable instructions are configured to execute the following operation. According to the CPRI line bit rate at the receiving end, the frame corresponding to the CPRI is encapsulated into a blocky frame combination in an FTN encapsulation mode. The blocky frame combination includes at least one blocky frame, each blocky frame includes 256 words, and each word includes a frame overhead byte and a frame payload byte.

In an embodiment, the computer executable instructions are configured to execute the following operations. When the frame overhead bytes included in the encapsulated blocky frame include a frame synchronization byte, a GCC byte, a BIP byte, an FEC frame payload byte, an OAM byte, a synchronization byte, an FEC frame overhead byte and an RES byte, the frame overhead bytes in a first word to a sixth word in the blocky frame are set to the frame synchronization bytes; the frame overhead byte in a seventh word in the blocky frame is set to the GCC byte; the frame overhead bytes in an eighth word to a tenth word in the blocky frame are set to the BIP bytes; the frame overhead bytes in an eleventh word to a 154th word in the blocky frame are set to the FEC frame payload bytes; the frame overhead bytes in a 155th word to a 226th word in the blocky frame are set to the OAM bytes; the frame overhead byte in a 227th word in the blocky frame is set to a synchronization byte; the frame overhead bytes in a 228th word to a 253th word in the blocky frame are set to the FEC frame overhead bytes; and the frame overhead bytes in a 254th word to a 256th word in the blocky frame are set to the RES bytes.

In an embodiment, the computer executable instructions are configured to execute the following operations. When the CPRI line bit rate at the receiving end is Option 1, the frame corresponding to the CPRI is encapsulated into a blocky frame combination including one blocky frame in the FTN encapsulation mode. When the CPRI line bit rate at the receiving end is Option 2, the frame corresponding to the CPRI is encapsulated into a blocky frame combination including two blocky frames in the FTN encapsulation mode. When the CPRI line bit rate at the receiving end is Option 3, the frame corresponding to the CPRI is encapsulated into a blocky frame combination including four blocky frames in the FTN encapsulation mode. When the CPRI line bit rate at the receiving end is Option 4, the frame corresponding to CPRI is encapsulated into a blocky frame combination including five blocky frames in the FTN encapsulation mode. When the CPRI line bit rate at the receiving end is Option 5, the frame corresponding to the CPRI is encapsulated into a blocky frame combination including eight blocky frames in the FTN encapsulation mode. When the CPRI line bit rate at the receiving end is Option 6, the frame corresponding to the CPRI is encapsulated into a blocky frame combination including 10 blocky frames in the FTN encapsulation mode. When the CPRI line bit rate at the receiving end is Option 7 or 7A, the frame corresponding to the CPRI is encapsulated into a blocky frame combination including 16 blocky frames in the FTN encapsulation mode. When the CPRI line bit rate at the receiving end is Option 8, the frame corresponding to the CPRI is encapsulated into a blocky frame combination including 20 blocky frames in the FTN encapsulation mode. When the CPRI line bit rate at the receiving end is Option 9, the frame corresponding to the CPRI is encapsulated into a blocky frame combination including 24 blocky frames in the FTN encapsulation mode. When the CPRI line bit rate at the receiving end is Option 10, the frame corresponding to the CPRI is encapsulated into a blocky frame combination including 48 blocky frames in the FTN encapsulation mode.

Figure 8:
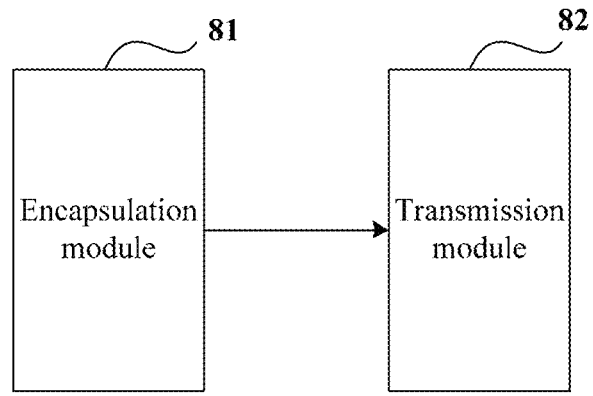
FIG. 8 is a structural diagram showing a device for data encapsulating according to a fifth embodiment of the present disclosure.

FIG. 8 is a structural diagram of a device for data encapsulating according to a fifth embodiment of the present disclosure. The device includes an encapsulation module 81 and a transmission module 82.

The encapsulation module 81 is configured to, in each data transmission cycle, according to the CPRI line bit rate in the at least one receiving end, for each receiving end, the frame corresponding to the CPRI is encapsulated into a blocky frame combination in an FTN encapsulation mode. The blocky frame combination includes at least one blocky frame. Each blocky frame includes 256 words, and each word includes a frame overhead byte and a frame payload byte.

The transmission module 82 is configured to transmit each blocky frame combination in a flex tunnel according to a preset sequence in which the data transmission is performed with each receiving end in a transmission cycle.

It should be noted that, when the device for data transmission in the foregoing embodiment performs data transmission, only the division of each of the foregoing program modules is illustrated. In actual applications, the processing may be allocated to be completed by different program modules as needed. That is, an internal structure of the device may be divided into different program modules to complete all or part of the processing described above. In addition, the device for data transmission and the method for data transmission in the foregoing embodiments are in the same concept, and the specific implementation process is described in detail in the method embodiment, and details are not described herein again.

Embodiments of the present disclosure further provide a device for data transmission, which includes a processor and a memory storing a computer program executable by the processor. The processor is configured to execute the following operations when running the computer program. In each data transmission cycle, according to the CPRI line bit rate in at least one receiving end, for each receiving end, the frame corresponding to the CPRI is encapsulated into a blocky frame combination in an FTN encapsulation mode. The blocky frame combination includes at least one blocky frame. Each blocky frame includes 256 words, and each word includes a frame overhead byte and a frame payload byte. Each blocky frame combination is mapped to a corresponding position in a flex tunnel for transmission according to a preset mapping position of each blocky frame combination in the transmission cycle.

Embodiments of the present disclosure further provide a computer storage medium having stored thereon computer executable instructions. The computer executable instructions are configured to execute the following operations. In each data transmission cycle, according to the CPRI line bit rate in at least one receiving end, for each receiving end, the frame corresponding to the CPRI is encapsulated into a blocky frame combination in an FTN encapsulation mode.

The blocky frame combination includes at least one blocky frame. Each blocky frame includes 256 words, and each word includes a frame overhead byte and a frame payload byte. Each blocky frame combination is mapped to a corresponding position in a flex tunnel for transmission according to a preset mapping position of each blocky frame combination in the transmission cycle.

In the embodiment of the present disclosure, FTN encapsulation is performed according to the CPRI line bit rate at the receiving end, and the encapsulated blocky frame combination includes at least one blocky frame, therefore, the encapsulation and transmission for the CPRI at any rate can be satisfied. The blocky frame has a fixed frame length, each blocky frame includes 256 words, and each word includes a frame overhead byte and a frame payload byte. The encapsulated frame has a simple structure, thereby effectively reducing an end-to-end transmission delay and improving a transmission efficiency.

For the device embodiment, since it is basically similar to the method embodiment, the description is simple, and the relevant parts can be referred to the description of the method embodiment.

It should be noted that, terms such as first and second used herein are only used to distinguish one entity or one operation from another entity or another operation, and do not necessarily require or imply that there is any such actual relationship or order between these entities or operations.

It should be understood by those skilled in the art that, the embodiments of the present disclosure may be provided as a method, a system, or a computer program product. Therefore, the present disclosure may take the form of an entirely hardware embodiment, an entirely software embodiment, or an embodiment combining software and hardware aspects. Moreover, the present disclosure may take the form of a computer program product which is embodied on one or more computer usable storage media (including, but not limited to, disk storage, CD-ROM and optical storage, and so forth) having computer usable program code embodied therein.

The present disclosure is described with reference to flowchart illustrations and/or block diagrams of methods, device (systems), and computer program products according to embodiments of the present disclosure. It will be understood that each flow and/or block of the flowchart and/or block diagram, and combinations of flows and/or blocks in a flowchart and/or block diagram may be implemented by computer program instructions. These computer program instructions may be provided to a processor of a general purpose computer, a special purpose computer, an embedded processor, or other programmable data processing device to produce a machine, such that the instructions, which is executed by a processor of a computer or other programmable data processing device, create means for implementing the functions specified in one or more flows of the flowchart or in one or more blocks of the block diagram.

The computer program instructions may also be stored in a computer readable memory that can direct a computer or other programmable data processing device to operate in a specific manner, such that the instructions stored in the computer readable memory produce an article of manufacture including the instruction means. The instruction means implements the functions specified in one or more flows of the flowchart and/or one or more blocks of the block diagram.

These computer program instructions may also be loaded onto a computer or other programmable data processing device such that a series of operational steps are performed on the computer or other programmable device to produce computer-implemented processing. Accordingly, the instructions executed on a computer or other programmable device provide operations for implementing the functions specified in one or more flows of a flowchart and/or one or more blocks of a block diagram.

Although the preferred embodiment of the present disclosure has been described, those skilled in the art can make additional modifications and variations to the embodiments once learning basic inventive concepts. Therefore, the appended claims are intended to be interpreted as including the preferred embodiments and all the modifications and variations falling within the scope of the present disclosure.

It will be apparent to those skilled in the art that various modifications and variations can be made to the present disclosure without departing from the spirit and scope of the present disclosure. Thus, the present disclosure is intended to cover the modifications and variations if the modifications and variations fall within the scope of the claims of the present disclosure and equivalent technique thereof.

INDUSTRIAL APPLICABILITY

In the technical solution of the embodiment of the present disclosure, FTN encapsulation is performed according to the CPRI line bit rate at the current receiving end, and the encapsulated blocky frame combination includes at least one blocky frame, which can satisfy the encapsulation and transmission for the CPRI at any rate. The blocky frame has a fixed frame length, each blocky frame includes 256 words, and each word includes a frame overhead byte and a frame payload byte. The encapsulated frame has a simple structure, thereby effectively reducing an end-to-end transmission delay and improving a transmission efficiency.

The invention claimed is:

1. A method for data encapsulation, comprising:
encapsulating, according to a common public radio interface (CPRI) line bit rate at a receiving end, a frame corresponding to the CPRI into a blocky frame combination in a front-haul transport network (FTN) encapsulation mode, wherein the blocky frame combination comprises at least one blocky frame, each blocky frame comprises 256 words, and each word comprises a frame overhead byte and a frame payload byte.

2. The method of claim 1, wherein the frame overhead byte comprised in each word occupies one byte, and the frame payload byte comprised in each word occupies 16 bytes.

3. The method of claim 1, wherein the blocky frame comprises at least one type of the following frame overhead bytes:
a frame synchronization byte, a general communication channel (GCC) byte, a bit interleaved parity (BIP) byte, a forward error correction (FEC) frame payload byte, an operation administration and maintenance (OAM) byte, a synchronization byte, an FEC frame overhead byte or a reserved (RES) byte.

4. The method of claim 3, wherein when the frame overhead bytes comprised in the blocky frame comprise the frame synchronization byte, the GCC byte, the BIP byte, the FEC frame payload byte, the OAM byte, the synchronization byte, the FEC frame overhead byte and the RES byte,
the frame overhead bytes in a first word to a sixth word in the blocky frame are the frame synchronization bytes;
the frame overhead byte in a seventh word in the blocky frame is the GCC byte;

the frame overhead bytes in an eighth word to a tenth word in the blocky frame are the BIP bytes;

the frame overhead bytes in an eleventh word to a 154th word in the blocky frame are the FEC frame payload bytes;

the frame overhead bytes in a 155th word to a 226th word in the blocky frame are the OAM bytes;

the frame overhead byte in a 227th word in the blocky frame is the synchronization byte;

the frame overhead bytes in a 228th word to a 253th word in the blocky frame are the FEC frame overhead bytes; and the frame overhead bytes in a 254th word to a 256th word in the blocky frame are the RES bytes.

5. The method of claim 1, wherein encapsulating, according to the CPRI line bit rate at the receiving end, the frame corresponding to the CPRI into the blocky frame combination in the FTN encapsulation mode comprises:

when the CPRI line bit rate at the receiving end is Option 1, encapsulating the frame corresponding to the CPRI into a blocky frame combination comprising one blocky frame in the FTN encapsulation mode;

when the CPRI line bit rate at the receiving end is Option 2, encapsulating the frame corresponding to the CPRI into a blocky frame combination comprising two blocky frames in the FTN encapsulation mode;

when the CPRI line bit rate at the receiving end is Option 3, encapsulating the frame corresponding to the CPRI into a blocky frame combination comprising four blocky frames in the FTN encapsulation mode;

when the CPRI line bit rate at the receiving end is Option 4, encapsulating the frame corresponding to the CPRI into a blocky frame combination comprising five blocky frames in the FTN encapsulation mode;

when the CPRI line bit rate at the receiving end is Option 5, encapsulating the frame corresponding to the CPRI into a blocky frame combination comprising eight blocky frames in the FTN encapsulation mode;

when the CPRI line bit rate at the receiving end is Option 6, encapsulating the frame corresponding to the CPRI into a blocky frame combination comprising 10 blocky frames in the FTN encapsulation mode;

when the CPRI line bit rate at the receiving end is Option 7 or 7A, encapsulating the frame corresponding to the CPRI into a blocky frame combination comprising 16 blocky frames in the FTN encapsulation mode;

when the CPRI line bit rate at the receiving end is Option 8, encapsulating the frame corresponding to the CPRI into a blocky frame combination comprising 20 blocky frames in the FTN encapsulation mode;

when the CPRI line bit rate at the receiving end is Option 9, encapsulating the frame corresponding to the CPRI into a blocky frame combination comprising 24 blocky frames in the FTN encapsulation mode; and when the CPRI line bit rate at the receiving end is Option 10, encapsulating the frame corresponding to the CPRI into a blocky frame combination comprising 48 blocky frames in the FTN encapsulation mode.

6. The method of claim 1, further comprising:

in each data transmission cycle, according to the CPRI line bit rate in at least one receiving end, for each receiving end, encapsulating the frame corresponding to the CPRI into a blocky frame combination in the FTN encapsulation mode, wherein the blocky frame combination comprises at least one blocky frame, each blocky frame comprises 256 words, and each word comprises a frame overhead byte and a frame payload byte; and mapping each blocky frame combination to a corresponding position in a flex tunnel for transmission according to a preset mapping position of each blocky frame combination in the transmission cycle.

7. The method of claim 1, wherein data content in each blocky frame is data content of the frame corresponding to the CPRI, transmitted by a CPRI rate corresponding to the CPRI line bit rate of Option 1.

8. A device for data encapsulation, comprising:

a processor; and a memory for storing a computer program executable on the processor, wherein when the computer program is executed by the processor, the processor is configured to:

save a common public radio interface (CPRI) line bit rate at a receiving end; and encapsulate, according to the CPRI line bit rate at the receiving end, a frame corresponding to the CPRI into a blocky frame combination in an front-haul transport network (FTN) encapsulation mode, wherein the blocky frame combination comprises at least one blocky frame, each blocky frame comprises 256 words, and each word comprises a frame overhead byte and a frame payload byte.

9. The device of claim 8, wherein the processor is further configured to, when the frame overhead bytes comprised in the encapsulated blocky frame comprise a frame synchronization byte, a general communication channel (GCC) byte, a bit interleaved parity (BIP) byte, a forward error correction (FEC) frame payload byte, an operation administration and maintenance (OAM) byte, a synchronization byte, an FEC frame overhead byte and a reserved (RES) byte, set the frame overhead bytes in a first word to a sixth word in the blocky frame to the frame synchronization bytes; set the frame overhead byte in a seventh word in the blocky frame to the GCC byte; set the frame overhead bytes in an eighth word to a tenth word in the blocky frame to the BIP bytes; set the frame overhead bytes in an eleventh word to a 154th word in the blocky frame to the FEC frame payload bytes; set the frame overhead bytes in an 155th word to a 226th word in the blocky frame to the OAM bytes; set the frame overhead byte in a 227th word in the blocky frame to the synchronization byte; set the frame overhead bytes in a 228th word to a 253th word in the blocky frame to the FEC frame overhead bytes; and set the frame overhead bytes in a 254th word to a 256th word in the blocky frame to the RES bytes.

10. The device of claim 8, wherein the processor is further configured to, when the CPRI line bit rate at the receiving end is Option 1, encapsulate the frame corresponding to the CPRI into a blocky frame combination comprising one blocky frame in the FTN encapsulation mode; when the CPRI line bit rate at the receiving end is Option 2, encapsulate the frame corresponding to the CPRI into a blocky frame combination comprising two blocky frames in the FTN encapsulation mode; when the CPRI line bit rate at the receiving end is Option 3, encapsulate the frame corresponding to the CPRI into a blocky frame combination comprising four blocky frames in the FTN encapsulation mode; when the CPRI line bit rate at the receiving end is Option 4, encapsulate the frame corresponding to the CPRI into a blocky frame combination comprising five blocky frames in the FTN encapsulation mode; when the CPRI line bit rate at the receiving end is Option 5, encapsulate the frame corresponding to the CPRI into a blocky frame combination comprising eight blocky frames in the FTN encapsulation mode; when the CPRI line bit rate at the receiving end is Option 6, encapsulate the frame corresponding to the CPRI into a blocky frame combination comprising 10 blocky frames in the FTN encapsulation mode; when the CPRI line bit rate at the receiving end is Option 7 or 7A, encapsulate the frame corresponding to the CPRI into a blocky frame combination comprising 16 blocky frames in the FTN encapsulation mode; when the CPRI line bit rate at the receiving end is Option 8, encapsulate the frame corresponding to the CPRI into a blocky frame combination comprising 20 blocky frames in the FTN encapsulation mode; when the CPRI line bit rate at the receiving end is Option 9, encapsulate the frame corresponding to the CPRI into a blocky frame combination comprising 24 blocky frames in the FTN encapsulation mode; and when the CPRI line bit rate at the receiving end is Option 10, encapsulate the frame corresponding to the CPRI into a blocky frame combination comprising 48 blocky frames in the FTN encapsulation mode.

11. The device of claim 8, wherein the processor is further configured to:
   in each data transmission cycle, according to the CPRI line bit rate in at least one receiving end, for each receiving end, encapsulate the frame corresponding to the CPRI into a blocky frame combination in the FTN encapsulation mode, wherein the blocky frame combination comprises at least one blocky frame, each blocky frame comprises 256 words, and each word comprises a frame overhead byte and a frame payload byte; and
   map each blocky frame combination to a corresponding position in a flex tunnel for transmission according to a preset mapping position of each blocky frame combination in the transmission cycle.

12. The device of claim 8, wherein data content in each blocky frame is data content of the frame corresponding to the CPRI, transmitted by a CPRI rate corresponding to the CPRI line bit rate of Option 1.

13. A non-transitory computer storage medium having stored therein computer executable instructions that, when executed by a processor, cause the processor to execute a method for data encapsulation, wherein the method comprises:
   encapsulating, according to a common public radio interface (CPRI) line bit rate at a receiving end, a frame corresponding to the CPRI into a blocky frame combination in a front-haul transport network (FTN) encapsulation mode, wherein the blocky frame combination comprises at least one blocky frame, each blocky frame comprises 256 words, and each word comprises a frame overhead byte and a frame payload byte.

14. The non-transitory computer storage medium of claim 13, wherein the frame overhead byte comprised in each word occupies one byte, and the frame payload byte comprised in each word occupies 16 bytes.

15. The non-transitory computer storage medium of claim 13, wherein the blocky frame comprises at least one type of the following frame overhead bytes:
   a frame synchronization byte, a general communication channel (GCC) byte, a bit interleaved parity (BIP) byte, a forward error correction (FEC) frame payload byte, an operation administration and maintenance (OAM) byte, a synchronization byte, an FEC frame overhead byte or a reserved (RES) byte.

16. The non-transitory computer storage medium of claim 15, wherein when the frame overhead bytes comprised in the blocky frame comprise the frame synchronization byte, the GCC byte, the BIP byte, the FEC frame payload byte, the OAM byte, the synchronization byte, the FEC frame overhead byte and the RES byte,
   the frame overhead bytes in a first word to a sixth word in the blocky frame are the frame synchronization bytes;
   the frame overhead byte in a seventh word in the blocky frame is the GCC byte;
   the frame overhead bytes in an eighth word to a tenth word in the blocky frame are the BIP bytes;
   the frame overhead bytes in an eleventh word to a 154th word in the blocky frame are the FEC frame payload bytes;
   the frame overhead bytes in a 155th word to a 226th word in the blocky frame are the OAM bytes;
   the frame overhead byte in a 227th word in the blocky frame is the synchronization byte;
   the frame overhead bytes in a 228th word to a 253th word in the blocky frame are the FEC frame overhead bytes; and
   the frame overhead bytes in a 254th word to a 256th word in the blocky frame are the RES bytes.

17. The non-transitory computer storage medium of claim 13, wherein encapsulating, according to the CPRI line bit rate at the receiving end, the frame corresponding to the CPRI into the blocky frame combination in the FTN encapsulation mode comprises:
   when the CPRI line bit rate at the receiving end is Option 1, encapsulating the frame corresponding to the CPRI into a blocky frame combination comprising one blocky frame in the FTN encapsulation mode;
   when the CPRI line bit rate at the receiving end is Option 2, encapsulating the frame corresponding to the CPRI into a blocky frame combination comprising two blocky frames in the FTN encapsulation mode;
   when the CPRI line bit rate at the receiving end is Option 3, encapsulating the frame corresponding to the CPRI into a blocky frame combination comprising four blocky frames in the FTN encapsulation mode;
   when the CPRI line bit rate at the receiving end is Option 4, encapsulating the frame corresponding to the CPRI into a blocky frame combination comprising five blocky frames in the FTN encapsulation mode;
   when the CPRI line bit rate at the receiving end is Option 5, encapsulating the frame corresponding to the CPRI into a blocky frame combination comprising eight blocky frames in the FTN encapsulation mode;
   when the CPRI line bit rate at the receiving end is Option 6, encapsulating the frame corresponding to the CPRI into a blocky frame combination comprising 10 blocky frames in the FTN encapsulation mode;
   when the CPRI line bit rate at the receiving end is Option 7 or 7A, encapsulating the frame corresponding to the CPRI into a blocky frame combination comprising 16 blocky frames in the FTN encapsulation mode;
   when the CPRI line bit rate at the receiving end is Option 8, encapsulating the frame corresponding to the CPRI into a blocky frame combination comprising 20 blocky frames in the FTN encapsulation mode;
   when the CPRI line bit rate at the receiving end is Option 9, encapsulating the frame corresponding to the CPRI into a blocky frame combination comprising 24 blocky frames in the FTN encapsulation mode; and when the CPRI line bit rate at the receiving end is Option 10, encapsulating the frame corresponding to the CPRI into a blocky frame combination comprising 48 blocky frames in the FTN encapsulation mode.

18. The non-transitory computer storage medium of claim 13, wherein the method further comprises:
in each data transmission cycle, according to the CPRI line bit rate in at least one receiving end, for each receiving end, encapsulating the frame corresponding to the CPRI into a blocky frame combination in the FTN encapsulation mode, wherein the blocky frame combination comprises at least one blocky frame, each blocky frame comprises 256 words, and each word comprises a frame overhead byte and a frame payload byte; and mapping each blocky frame combination to a corresponding position in a flex tunnel for transmission according to a preset mapping position of each blocky frame combination in the transmission cycle.

19. The non-transitory computer storage medium of claim 13, wherein data content in each blocky frame is data content of the frame corresponding to the CPRI, transmitted by a CPRI rate corresponding to the CPRI line bit rate of Option 1.

* * * * *